United States Patent
Takahashi et al.

[11] Patent Number: 5,944,042
[45] Date of Patent: Aug. 31, 1999

[54] FLOW FORCE COMPENSATING METHOD AND FLOW CONTROL VALVE OF SPOOL TYPE USING THE SAME METHOD

[75] Inventors: Tamami Takahashi, Tokyo; Yuichi Usami, Hyogo-ken, both of Japan

[73] Assignee: Ebara Corporation, Tokyo, Japan

[21] Appl. No.: 08/996,825

[22] Filed: Dec. 23, 1997

[30] Foreign Application Priority Data

Dec. 26, 1996 [JP] Japan .................................. 8-348430

[51] Int. Cl.[6] .................................................. F15B 13/04
[52] U.S. Cl. ........................ 137/1; 137/625.69; 251/282
[58] Field of Search ................... 137/1, 625.69; 251/282

[56] References Cited

U.S. PATENT DOCUMENTS

| | | |
|---|---|---|
| 2,747,612 | 5/1956 | Lee . |
| 3,630,230 | 12/1971 | Stahle ................................ 251/282 X |
| 3,747,642 | 7/1973 | Tolbert, Jr. . |
| 4,122,867 | 10/1978 | Zagotta . |
| 4,122,868 | 10/1978 | Holloway et al. . |
| 4,155,535 | 5/1979 | Seamone ......................... 137/625.69 X |
| 4,646,786 | 3/1987 | Herder et al. . |
| 4,923,172 | 5/1990 | Wood et al. . |
| 4,941,508 | 7/1990 | Hennessy et al. .................. 137/625.69 |
| 5,186,213 | 2/1993 | Urata et al. . |
| 5,617,895 | 4/1997 | Pfuhl et al. . |
| 5,697,401 | 12/1997 | Shinoda et al. ................. 137/625.69 X |

FOREIGN PATENT DOCUMENTS

| | | |
|---|---|---|
| 0 753 669 | 1/1997 | European Pat. Off. . |
| 2 384 188 | 10/1978 | France . |
| 2-93104 | 3/1990 | Japan . |
| WO 84/03342 | 8/1984 | WIPO . |
| WO 94/21947 | 9/1994 | WIPO . |

*Primary Examiner*—Gerald A. Michalsky
*Attorney, Agent, or Firm*—Oblon, Spivak, McClelland, Maier & Neustadt, P.C.

[57] ABSTRACT

A flow force compensating method for a flow control valve and a flow control valve using the same method, in which a spool is supported by hydrostatic bearings within a sleeve and fluid flow from the hydrostatic bearing flows into a valve space defined between a spool land and a circumferential groove of the sleeve, wherein a circumferential groove is formed in the spool land, bearing fluid flow flowing out of the bearing into the valve space defined between the circumferential groove and the sleeve groove is directed toward a central axis of the spool, and control flow is swirled by the bearing fluid flow, thereby compensating a flow force, acting on the spool.

10 Claims, 7 Drawing Sheets

D1<D2

D1<D2

FLOW FORCE COMPENSATING METHOD AND FLOW CONTROL VALVE OF SPOOL TYPE USING THE SAME METHOD

BACKGROUND OF THE INVENTION

The present invention relates to a flow force compensating method for a flow control valve having a fluid passage structure in which control fluid flows from a valve stem space, via a control orifice, into a valve land space defined between a spool land and a circumferential groove formed in a sleeve, and such a flow control valve of spool type using the same method.

In flow control valves of spool type, there has been proposed a method for supporting a valve spool by hydrostatic bearings in order to improve the sliding property of the spool. For example, Japanese Patent Application No. 8-182016 (1996) according to the Applicant describes a hydraulic electromagnetic proportional control valve using hydrostatic bearings.

FIG. 13 is a sectional view showing an example of a flow control valve using such hydrostatic bearings. In FIG. 13, a spool 1 is slidably mounted within a sleeve S and hydrostatic bearings 19 are provided on both ends of the spool. By supplying pressurized fluid from a supply port P to the hydrostatic bearings 19, the spool is supported within the sleeve without contacting with the sleeve. The spool 1 can be shifted to the left or the right from a neutral position as shown by a spool drive means D such as a solenoid, so that a valve opening is adjusted by the position of lands 2, 2a, 2b, thereby controlling flow rates of fluid flowing between ports P, 17 and 18.

FIG. 11 shows the spool 1 incorporated in the flow control valve stated above.

In FIG. 11, the spool 1 has lands 2a and 2, 2b having a large diameter at its central portion and both end portions and stems 3, 3a having small diameter between the lands, and the lands 2, 2b are supported by hydraulic bearings. Incidentally, the spool shown in FIG. 11 is a conventional one and is not subjected to flow force compensation which will be described later.

In the conventional flow control valve, however, when the valve is opened to flow control fluid around the spool, a flow force tending to close the valve is generated. FIG. 12 shows a condition wherein the spool is shifted from a neutral position to the right so that the fluid flows from a control port 18 to a return port 17. In FIG. 12, when the fluid flows through a valve stem space 15, different pressure distributions are generated on both end walls defining the valve stem space 15. The difference in pressure distributions creates a so called flow force F acting on the spool 1 which tends to close the valve.

When the flow force thus caused is great, a large driving force is needed to shift the spool from the neutral position to an operating position, and, thus, a drive means having greater output power is needed for driving the spool. If the drive output is insufficient, the spool cannot be shifted, thereby causing a trouble in valve operation.

Further, the flow force sometimes generates self-excited vibration in the spool which deteriorates the valve function.

As one of techniques for compensating such flow force, there has been proposed a method in which a circumferential groove is formed in the spool lands and swirl flow is generated in a valve land space (called as "bucket") defined by a circumferential groove formed in the sleeve and the circumferential groove formed in the spool. In this method, however, the swirl flow is not positively generated and the flow force cannot sufficiently be compensated.

To eliminate the above-mentioned inconvenience, conventionally, there has been proposed an attempt in which desired swirl flow is provided by changing configurations of the circumferential grooves in the sleeve and the spool, i.e., changing a configuration of the bucket. However, in this attempt, the configurations of the circumferential grooves are releatively complicate and troublesome working is needed to machine the circumferential grooves accurately. In particular, since the circumferential groove of the sleeve is formed by cutting an inner peripheral surface of the sleeve, it is difficult to form such a circumferential groove accurately in the sleeve.

SUMMARY OF THE INVENTION

Accordingly, an object of the present invention is to provide a flow force compensating method and a flow control valve of spool type, in which desired swirl flow can be generated without making the configuration of a bucket complicated.

Another object of the present invention is to provide a flow force compensating method and a flow control valve of spool type, wherein a swirl flow for compensating the flow force is positively generated.

To achieve the above mentioned objects, according to the present invention, there is provided a flow force compensating method for a flow control valve including a sleeve, a spool slidably provided in the sleeve and having a stem and a land, and a fluid passage structure formed in the control valve. The fluid passage structure includes a valve stem space formed between the stem and the sleeve, and a valve land space defined between the land and a circumferential groove formed in the sleeve and a control fluid flows from the valve stem space, through a control orifice, into the valve land space. A circumferential groove is formed in the land so as to define the valve land space and an auxiliary fluid flow is supplied into the valve land space toward a central axis of the spool from a side opposing to the control orifice, whereby the control fluid is swirled within the valve land space so as to compensate a flow force acting on the spool.

The auxiliary fluid flow may be provided by a bearing fluid flowing out of a hydrostatic bearing provided between the sleeve and the land of the spool.

The auxiliary fluid flow can be directed toward the central axis of the spool by positioning an end wall of the circumferential groove formed in the land axially outward of an end wall of the circumferntial groove formed in the sleeve.

The control fluid is swirled within the valve land space in such a way that an axial flow velocity component of the control fluid flow along a bottom surface of the circumferntial groove is greater on the control orifice side than on the opposite side thereof.

According to an another aspect of the present invention, to achieve the above objects, there is provided a flow control valve of spool type including a sleeve, a spool slidably provided in the sleeve and having a stem and a land, and a fluid passage structure formed in the control valve. The fluid passage structure includes a valve stem space formed between the stem and the sleeve, and a valve land space defined between the land and a circumferential groove formed in the sleeve and a control orifice formed at an end of the land facing the stem space. A circumferential groove is formed in the land so as to define the valve land space, and means for supplying an auxiliary fluid flow into the valve land space toward a central axis of the spool from a side opposing to the control orifice is provided, whereby the control fluid is swirled within the valve land space so as to compensate a flow force acting on the spool.

The auxiliary fluid flow may be provided by a bearing fluid flowing out of a hydrostatic bearing provided between the sleeve and the land of the spool.

An end wall of the circumferential groove formed in the land can be positioned axially outward of an end wall of the circumferential groove formed in the sleeve to direct the auxiliary fluid flow toward the central axis of the spool.

A bottom surface of the circumferential groove formed in the spool land may include a slant surface on the side of the control orifice and an end wall portion on the opposite side thereof, and an angle of the slant surface relative to the spool axis is made smaller than that of the end wall portion.

The hydrostatic bearing may be a taper land bearing or a stepped bearing.

The control valve may be a four-way flow control valve including a supply port, a return port and two control ports or a three-way flow control valve including a supply port, a return port and a control port.

According to the present invention, since a fluid flow directing toward the central axis of the spool is used as the auxiliary flow for swirling the control fluid flow, the stable swirl flow can positively be formed with a simple bucket configuration, thereby easily compensating the flow force of the spool.

Accordingly, the drive means for shifting the spool can be made compact, thereby making the entire spool valve compact and light-weighted.

Further, valve vibration due to the flow force can be eliminated, and, thus, the valve can be operated stably.

In addition, when the drive means having the same output power is used, control of a larger amount flow rate can be obtained.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

The present invention will now be explained in connection with preferred embodiments thereof with reference to the accompanying drawings.

Figure 1:
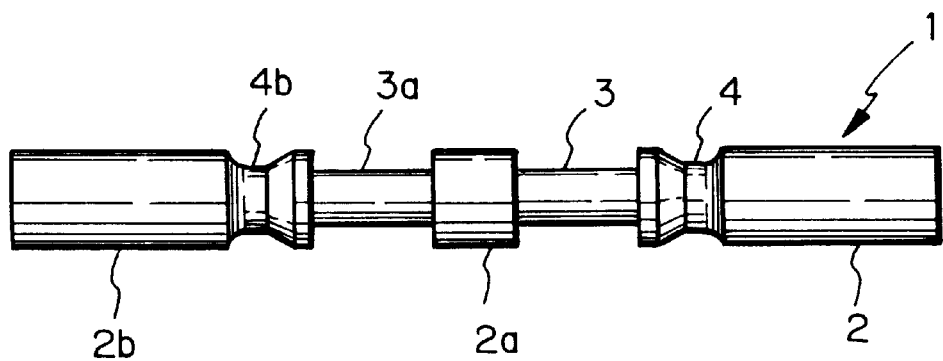
FIG. 1 is a side view of a spool according to a first embodiment of the present invention.

FIG. 1 shows a spool of a flow control valve of spool type according to a first embodiment of the invention. A spool generally indicated by the reference numeral 1 has end lands 2, 2b and a central land 2a, and stems 3, 3a formed between the lands, and circumferential grooves 4, 4b are formed in the lands 2, 2b near inner end portions thereof.

Figure 2:
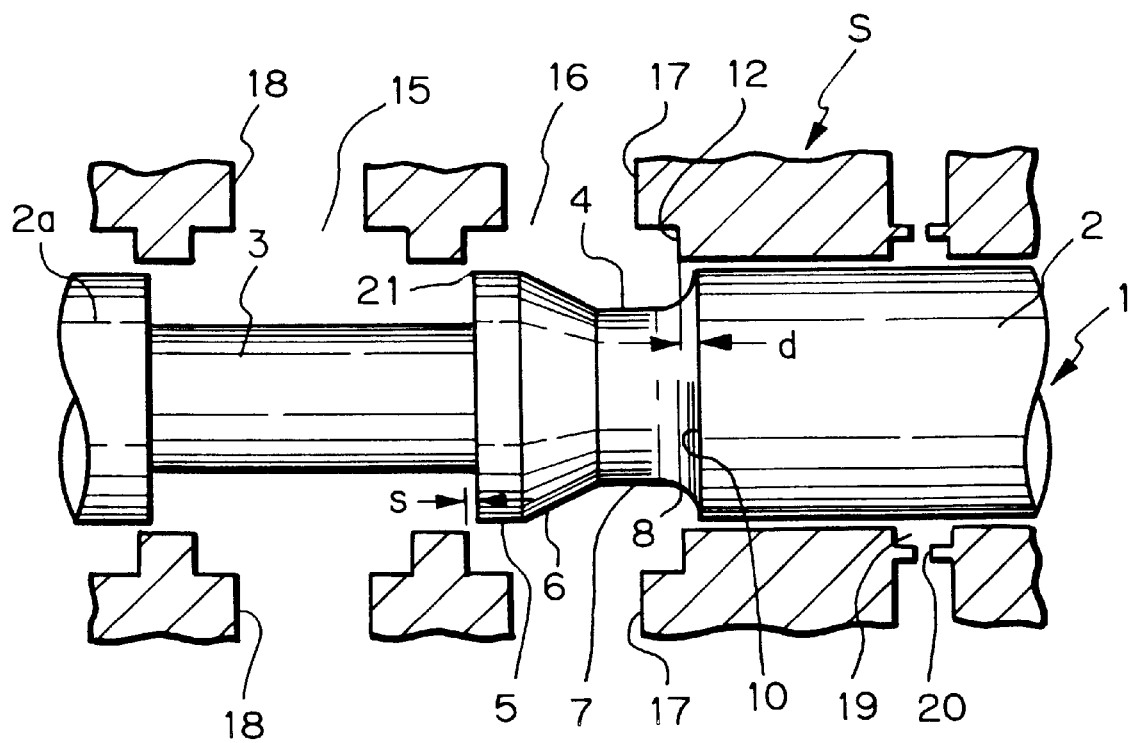
FIG. 2 is an enlarged sectional view showing circumferential grooves formed in a spool and a sleeve which form main parts of the present invention.

FIG. 2 is a partial enlarged sectional view of the control valve wherein the spool of FIG. 1 is housed in a sleeve S. The circumferential groove 4 is formed in the end land 2 near a control orifice portion 21 facing the central land and a straight portion 5 having the same diameter as that of the land 2 is left between the control orifice 21 and the groove 4. The circumferential groove 4 is defined by an inclined wall portion 6 of a gentle slope connected to a bottom wall portion 7 of the groove and a groove end wall 10 connected to the bottom wall portion 7 through a curved wall portion 8.

In the neutral position, the groove end wall 10 of the spool circumferential groove 4 is positioned outwardly of a groove end wall 12 of the sleeve S.

Incidentally, the reference numeral 15 denotes a valve stem space formed at the stem 3; 16 denotes a valve land space formed at the land 2; 17 denotes a return port; 18 denotes a control port; 19 denotes a pocket of a hydrostatic bearing; and 20 denotes a restriction of the hydrostatic bearing.

Now, a flow of the fluid will be explained with reference to FIGS. 3 to 7.

Figure 3:
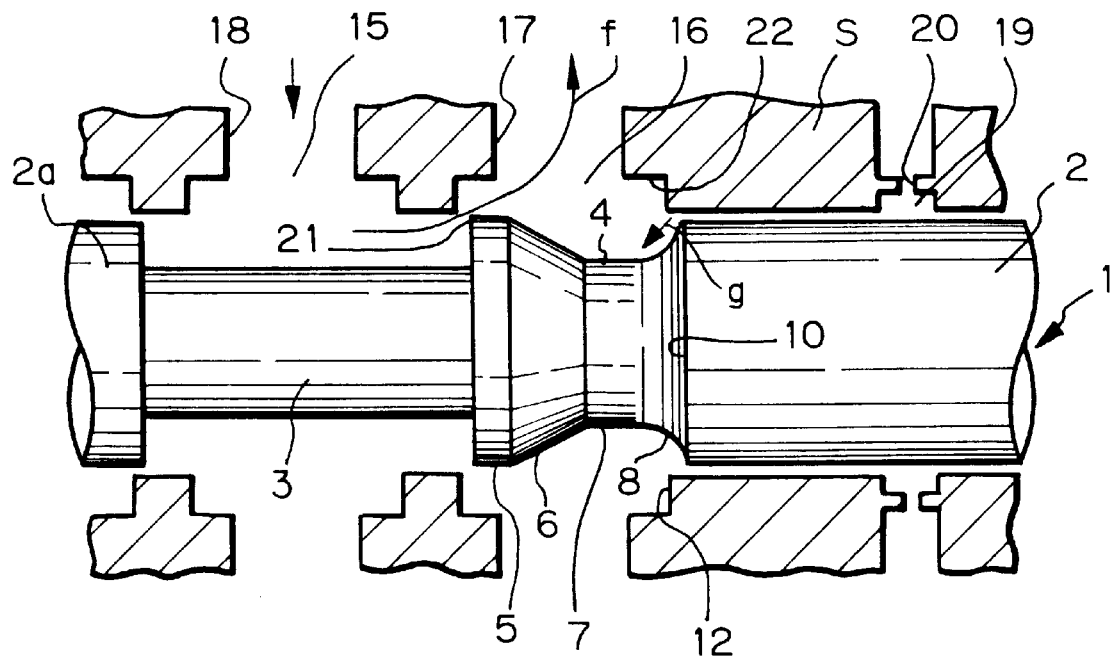
FIG. 3 is a sectional view taken along III—III in FIG. 4 for explaining a function of the invention.
Figure 4:
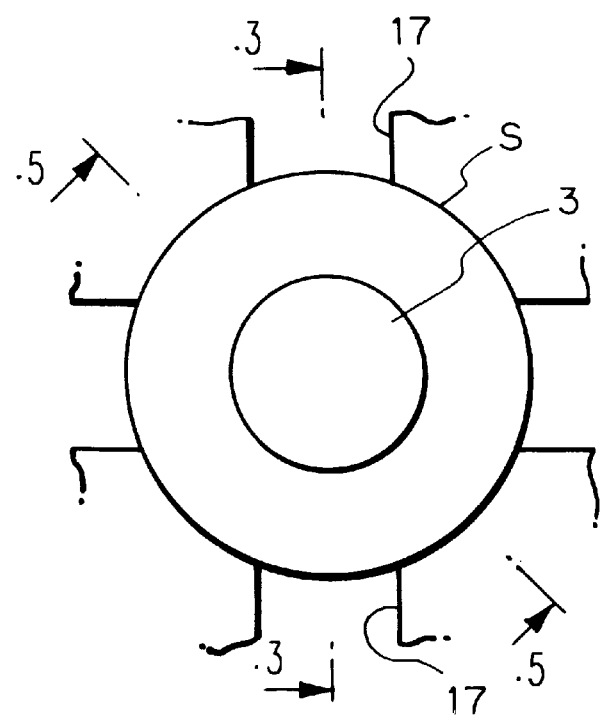
FIG. 4 is a cross-sectional view of the spool and the sleeve.

FIG. 3 shows a flowing condition of the control fluid in a sectional plane passing through the ports 17, 18 of the sleeve S (section III—III in FIG. 4). Pressurized fluid from the control port 18 flows into the valve stem space 15 formed at the spool stem 3 (flow of the pressurized fluid is indicated by the arrow) and then flows into the valve land space 16 formed at the land 2 through the control orifice portion 21 as shown by the arrow f to reach the return port 17. The arrow g indicates bearing fluid flow flowing out of the hydrostatic bearings 19 (only one is shown) provided on both ends of the spool into the valve land space 16.

Figure 5:
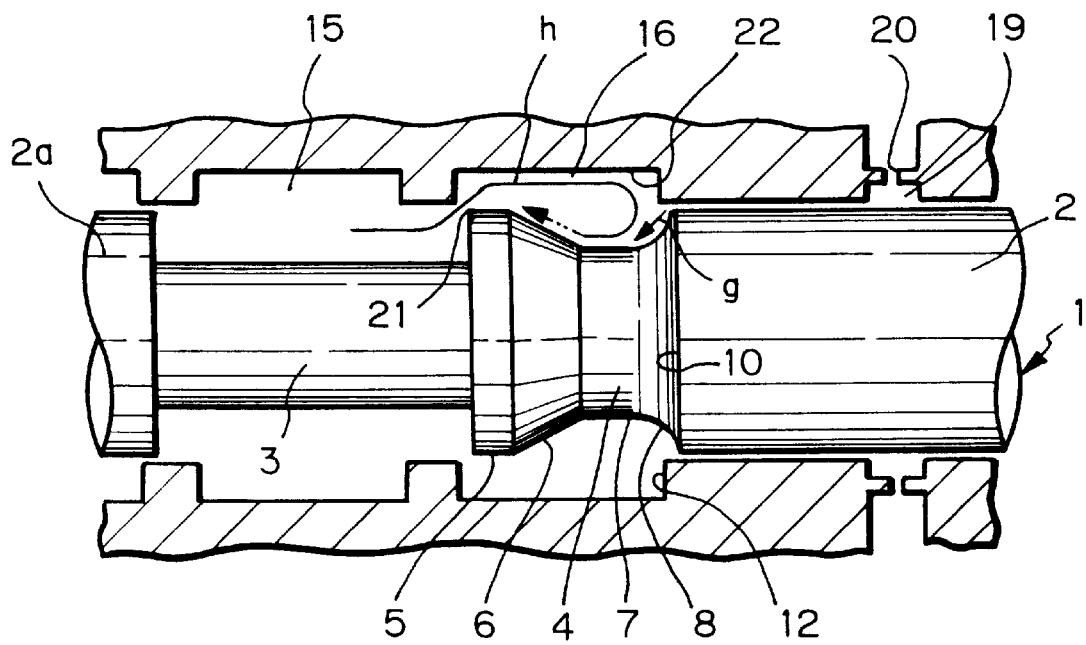
FIG. 5 is a sectional view taken along V—V in FIG. 4 for explaining a function of the present invention.

FIG. 5 shows a flowing condition of the control fluid in a sectional plane not including any port (section V—V in FIG. 4). Since the end wall 10 of the circumferential groove 4 is positioned outwardly of the groove end wall 12 of the sleeve S (i.e., nearer the pocket 19 of the hydrostatic bearing), the bearing fluid flow g is directed toward a central axis of the spool 1. On the other hand, control fluid flow h flowing out of the valve stem space 15 through the control orifice portion 21 into the valve land space 16 firstly flows toward a groove end wall 12 of the sleeve along a bottom wall portion 22 of the circumferential groove in the sleeve S and is then pulled radially inwardly by the bearing fluid flow g being directed toward the central axis of the spool to form control fluid flow flowing along the curved wall portion 8, bottom wall portion 7 and inclined wall portion 6. That is to say, a swirl flow is generated in the valve land space 16. In this way, the bearing fluid flow g being directed toward the central axis of the spool acts as auxiliary flow for assisting swirling of the control fluid flow h.

The reason why the bearing fluid flow is directed toward the central axis of the spool is that the groove end wall 10 of the circumferential groove 4 of the spool 1 is positioned outwardly of the groove end wall 12 of the sleeve S. By selecting dimensions of the grooves so that the groove end wall 10 of the spool is positioned outwardly of the groove end wall 12 of the sleeve when the spool 1 is positioned at the neutral position, when the spool is shifted from the neutral position, the valve is opened, while the bearing fluid flow is always directed toward the central axis of the spool in the valve land space in which the control fluid flow is supplied.

Figure 6:
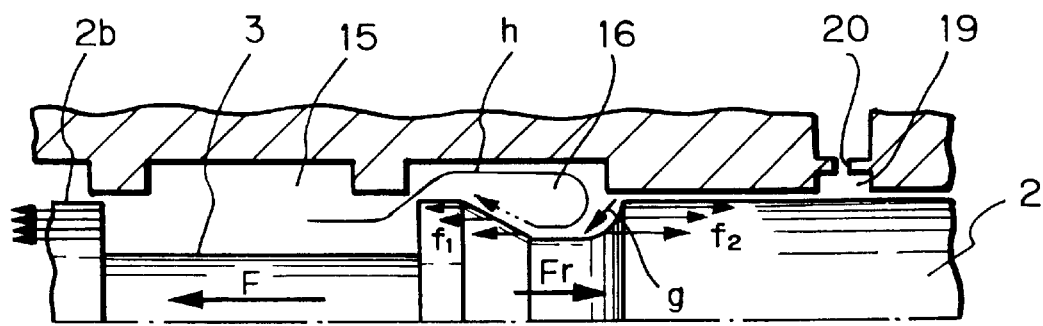
FIG. 6 is a partial view for supplementary explanation of the function of the embodiment shown in FIG. 5.

When the swirl flow is generated, as shown in FIG. 6, pressure distributions are generated on the end wall 10 and the inclined wall portion 6 of the circumferential groove of the spool. Although a speed of the fluid flowing along the end wall 10 is substantially the same as that of the fluid flowing along the inclined surface 6, flowing angles thereof relative to the spool axis are different from each other. Since the fluid flowing along the gently inclined wall portion 6 has a greater axial velocity component, smaller hydrostatic pressure distribution f1 acts on the inclined wall portion in the spool axial direction. To the contrary, regarding the end wall portion 10, since the fluid flow has a smaller axial velocity component, greater axial hydrostatic pressure distribution f2 acts on the end wall portion 10 in the spool axial direction.

Accordingly, the difference in pressure distributions between f1 and f2 generated in the valve spool 1 creates a flow force Fr directing toward the right in FIG. 6 and acting on the spool. Since this rightward flow force Fr cancels the aforementioned flow force F caused in the valve space 15, the leftward flow force F is reduced.

The curved wall portion 8 formed in the circumferential groove of the spool has a shape for reversing and guiding the fluid flow toward the inclined wall portion 6 and, thus, includes a gentle slope in the vicinity of the bottom wall portion 7 of the groove. However, since a projected area of the gentle slope (against which the low pressure distribution acts) in the axial direction is small, a force acting on the gentle slope is substantially the same as that acting on a vertical surface. Thus, by providing the curved wall portion in this area, the swirl flow can easily be generated while suppressing a deterioration on the flow force compensating effect.

Figure 7:
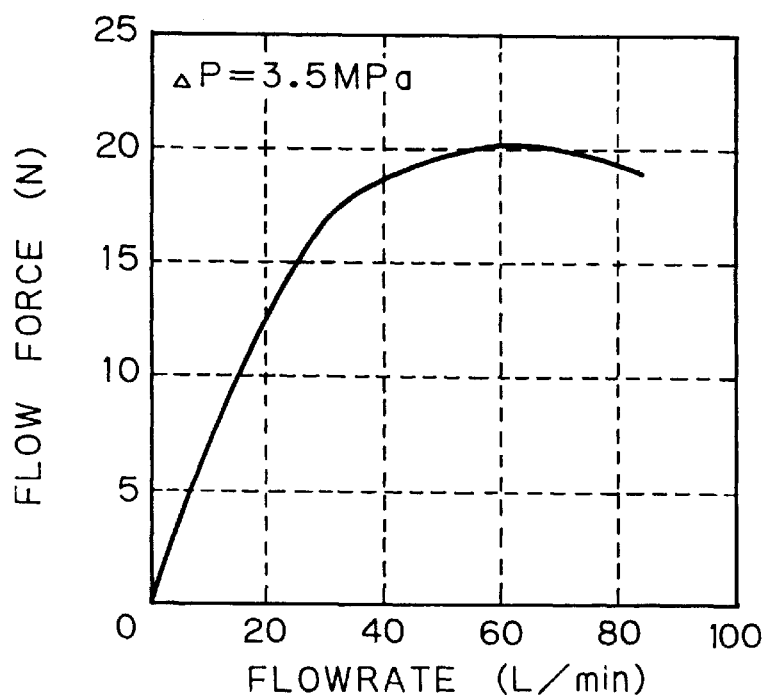
FIG. 7 is a graph showing characteristics regarding a flow rate and a flow force acting on a conventional spool.
Figure 8:
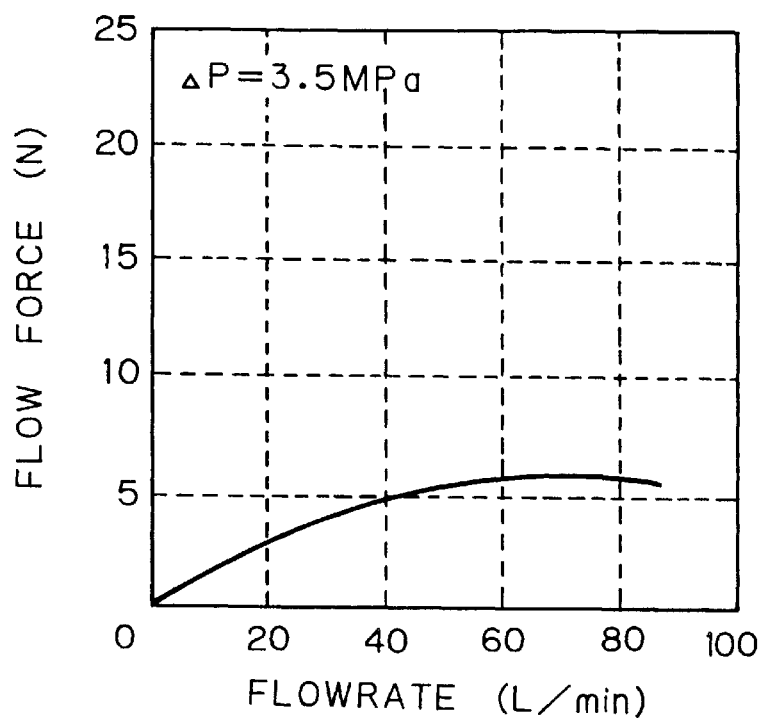
FIG. 8 is a graph showing characteristics regarding a flow rate and a flow force acting on a spool according to the present invention.

FIG. 7 is a graph showing flow rate flow force characteristics of a conventional spool and FIG. 8 is a graph showing the same characteristics of the spool of the present invention. In these graphs, the ordinate indicates the flow force and the abscissa indicates the flow rate. As can be seen from the graphs, in the present invention, the flow force is reduced to about ¼ of the flow force generated in the conventional spool. That is to say, the spool can be shifted by a driving force of about ¼ of the conventional driving force.

Incidentally, the data in the graph were obtained when difference in pressure across the control orifice is set to 3.5 MPa.

Figure 9:
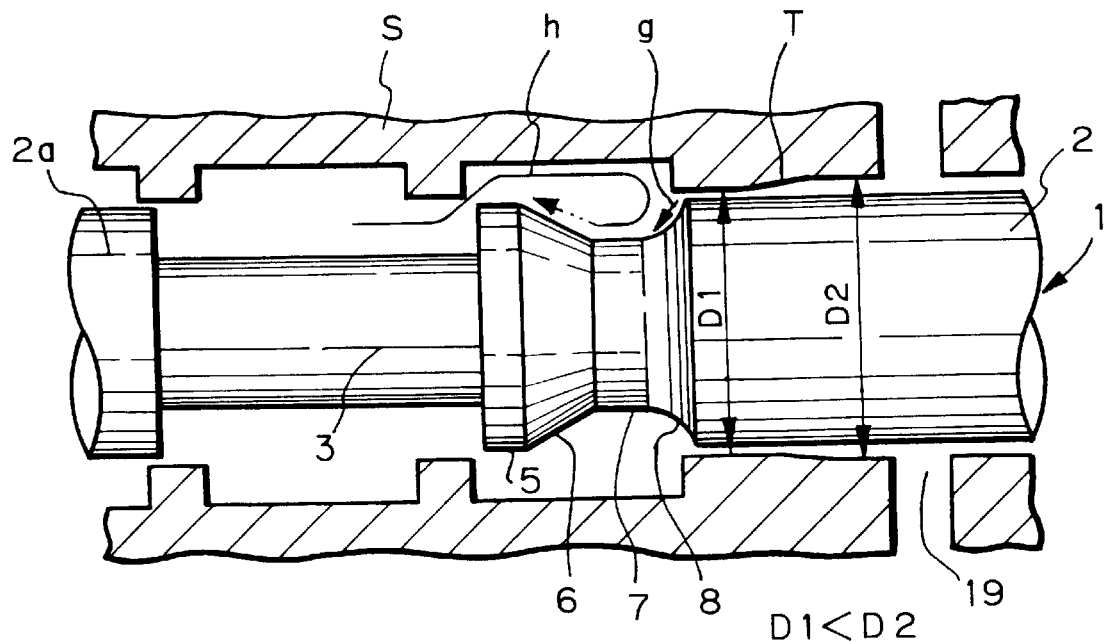
FIG. 9 is a view showing another embodiment of the present invention.
Figure 10:
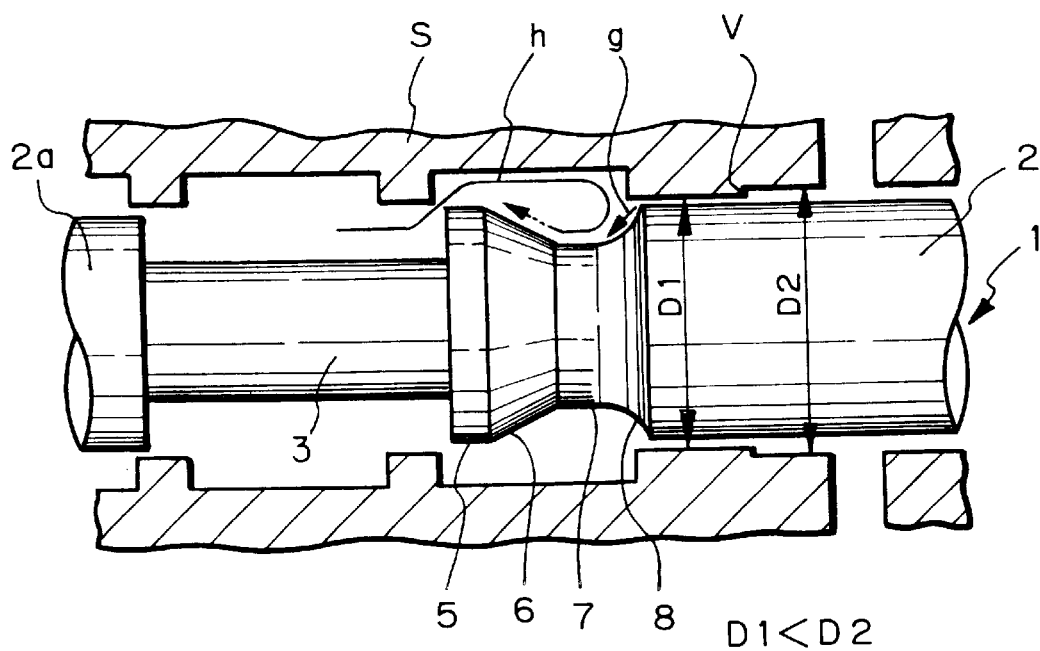
FIG. 10 is a view showing a further embodiment of the present invention.
Figure 11:
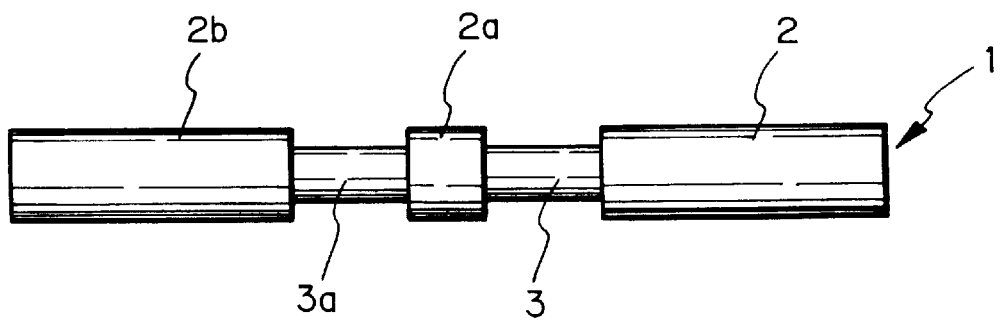
FIG. 11 is a view showing a conventional spool.
Figure 12:
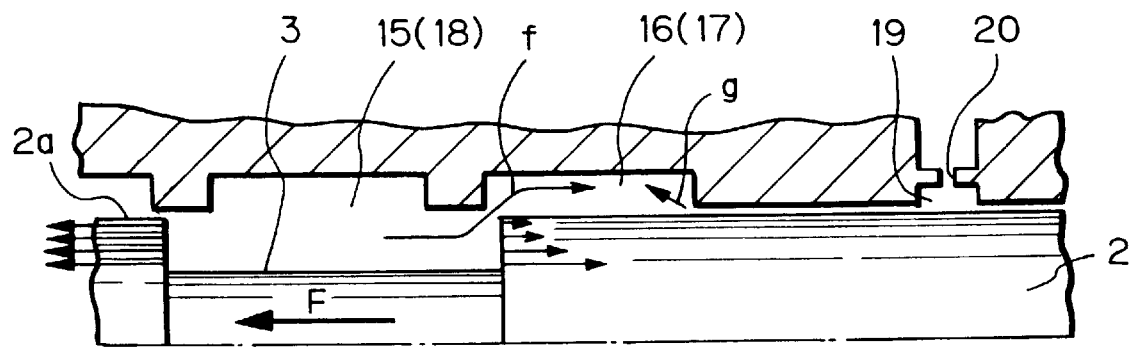
FIG. 12 is a view for explaining an axial flow force acting on the spool of FIG. 11.
Figure 13:
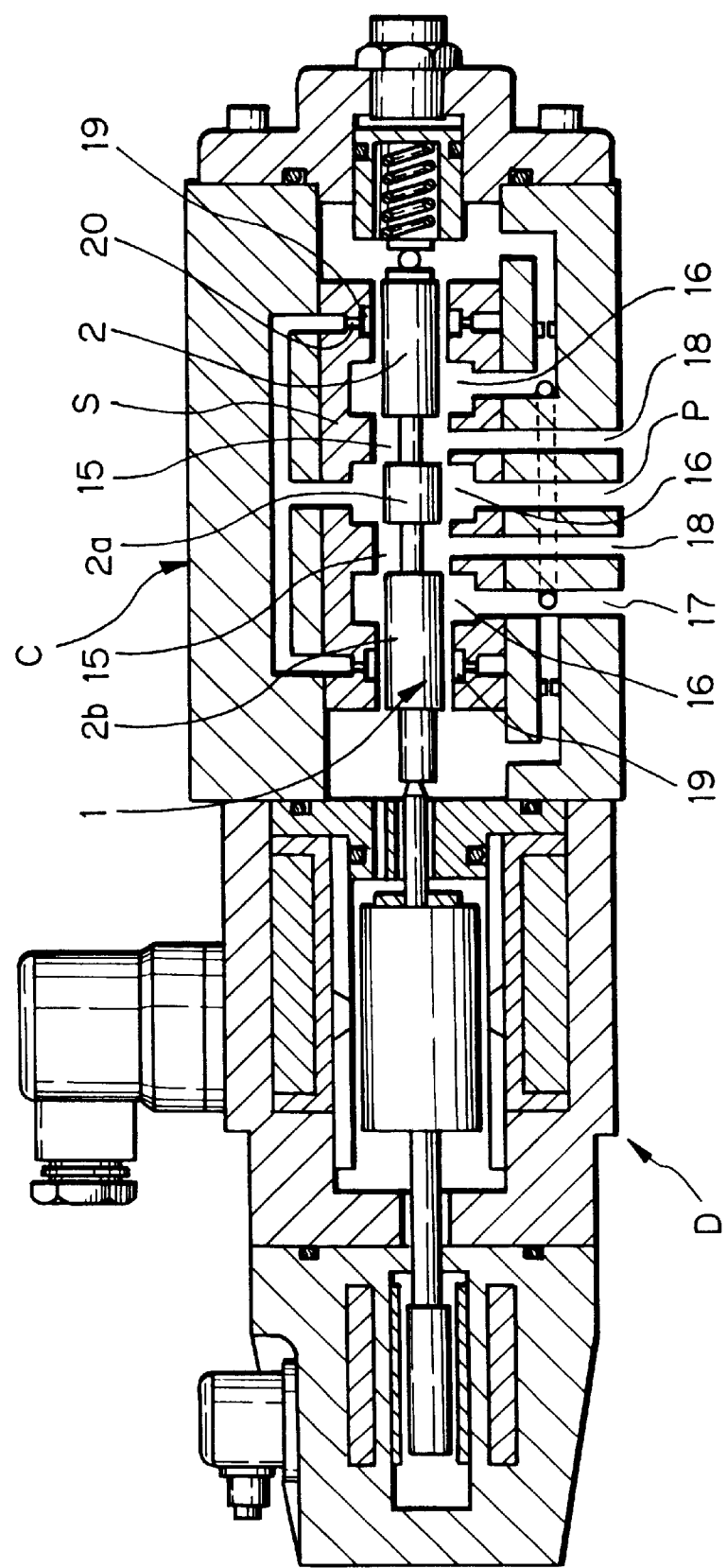
FIG. 13 is a sectional view of a conventional flow rate control valve of spool type.

FIGS. 9 and 10 are views showing other embodiments of the present invention, where FIG. 9 shows a taper land bearing in which a taper T is formed on the hydrostatic bearing at the sleeve side and FIG. 10 shows a stepped bearing in which a stepped portion V is formed on the hydrostatic bearing at the sleeve side.

In all cases, by utilizing circumferential pressure distribution created by fluid flow flowing from a side D2 having a greater clearance between the spool and the sleeve to a side D1 having a smaller clearance between the spool and the sleeve, the spool is maintained in the center of the sleeve. The bearing fluid flow g as an auxiliary flow for generating the swirl flow is the same as that in the first embodiment and achieve the same technical effect.

Instead, the taper T or the stepped portion V can be provided on the surface of the spool side.

In the above-mentioned embodiments, while an example of a the four-way flow control valve having the supply port, return port and two control ports was explained, the present invention can be applied to a three-way flow control valve having a supply port, a return port and a control port.

As stated above, in the present invention, since a fluid flow directing toward the central axis of the spool is used as the auxiliary flow for swirling the control fluid flow, the stable swirl flow can positively be formed with a simple bucket configuration, thereby easily compensating the flow force acting on the spool.

Accordingly, the drive means for shifting the spool can be made compact, thereby making the entire spool valve compact and light-weighted.

Further, valve vibration due to the flow force can be eliminated, and, thus, the valve can be operated stably.

In addition, when the drive means having the same output power is used, control of a larger amount flow rate can be obtained.

What is claimed is:

1. A flow force compensating method for a flow control valve including a sleeve, a spool slidably provided in said sleeve and having a stem and a land, and a fluid passage structure formed in said control valve, said fluid passage structure including a valve stem space formed between said stem and said sleeve, and a valve land space defined between said land and a circumferential groove formed in said sleeve, wherein a control fluid flows from said valve stem space, through a control orifice, into said valve land space, wherein a circumferential groove is formed in said land so as to define said valve land space, an auxiliary fluid flow is supplied into said valve land space toward a central axis of said spool from a side opposing to said control orifice, whereby said control fluid is swirled within said valve land space so as to compensate a flow force acting on said spool, wherein said control fluid is swirled within said valve land space in such a way that an axial flow velocity component of said control fluid flow along a bottom surface of said circumferential groove is greater on said control orifice side than on an opposite side thereof.

2. A flow force compensating method claimed in claim 1, wherein said auxiliary fluid flow is provided by a bearing fluid flowing out of a hydrostatic bearing provided between said sleeve and said land of said spool.

3. A flow force compensating method claimed in claim 1 or 2, wherein said auxiliary fluid flow is directed toward said spool axis by positioning an end wall of said circumferential groove formed in said land axially outward of an end wall of said circumferential groove formed in said sleeve.

4. A flow control valve of spool type including a sleeve, a spool slidably provided in said sleeve and having a stem and a land, and a fluid passage structure formed in said control valve, said fluid passage structure including a valve stem space formed between said stem and said sleeve, and a valve land space defined between said land and a circumferential groove formed in said sleeve, a control orifice formed at an end of said land facing said stem space, further comprising a circumferential groove formed in said land so as to define said valve land space and means for supplying an auxiliary fluid flow into said valve land space toward a central axis of said spool from a side opposing to said control orifice, whereby said control fluid is swirled within said valve land space to compensate a flow force acting on said spool, wherein a bottom surface of said circumferential groove formed in said spool land includes a slant surface on the side of said control orifice and an end wall portion on an opposite side thereof wherein an angle of said slant surface relative to said spool axis is smaller than that of said end wall portion.

5. A flow control valve of spool type claimed in claim 4, wherein said auxiliary fluid flow is provided by a bearing fluid flowing out of a hydrostatic bearing provided between said sleeve and said land of said spool.

6. A flow control valve of spool type claimed in claim 4 or 5, wherein an end wall of said circumferential groove formed in said land is positioned axially outward of an end wall of said circumferential groove formed in said sleeve.

7. A flow control valve of spool type claimed in claim 5, wherein said hydrostatic bearing is a taper land bearing.

8. A flow control valve of spool type claimed in claim 4 or 5, wherein said valve is a four-way flow control valve including a supply port, a return port and two control ports.

9. A flow control valve of spool type claimed in claim 5, wherein said hydrostatic bearing is a stepped bearing.

10. A flow control valve of a spool type claimed in claim 4 or 5, wherein said valve is a three-way flow control valve including a supply port, a return port and a control port.

* * * * *